C. LINDSEY.
MEAT CUTTER.
APPLICATION FILED JUNE 2, 1916.
1,218,096.
Patented Mar. 6, 1917.
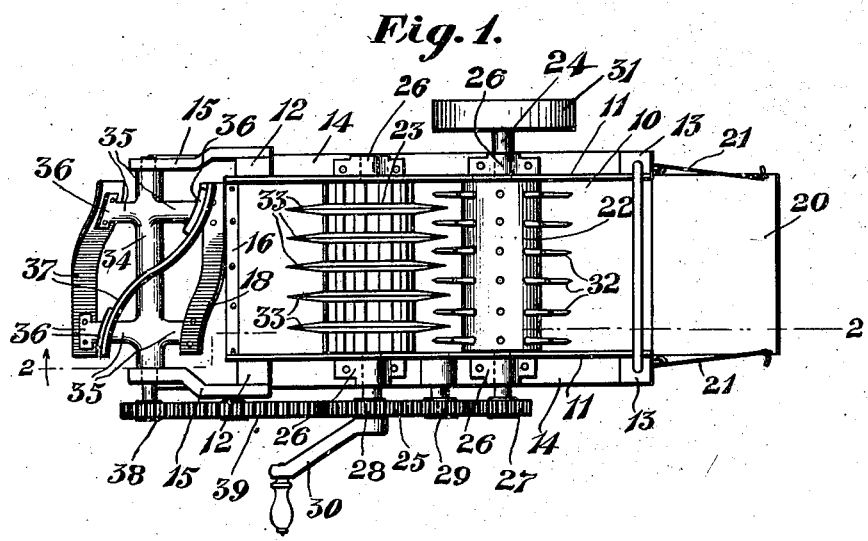
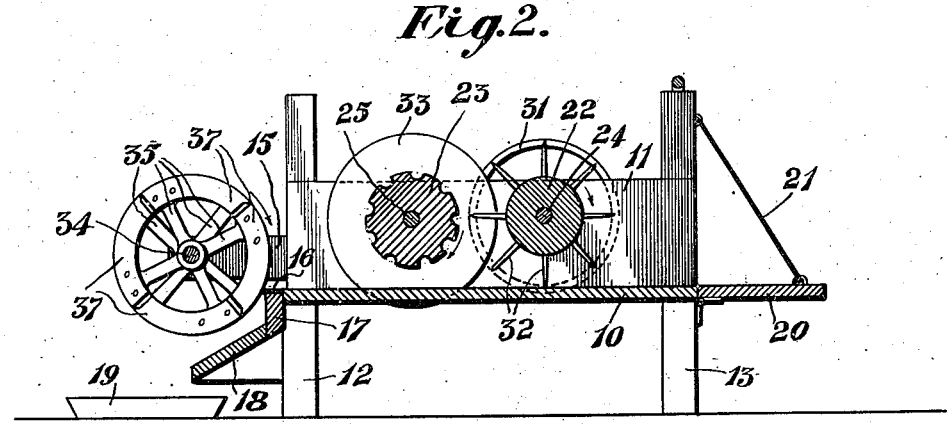
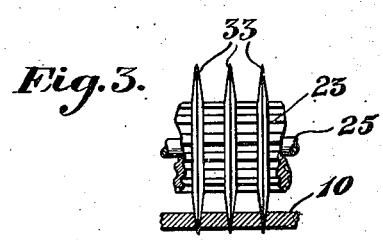
WITNESSES
INVENTOR
Clinton Lindsey
BY
ATTORNEY

UNITED STATES PATENT OFFICE.

CLINTON LINDSEY, OF SALEM, NEW JERSEY, ASSIGNOR OF ONE-HALF TO E. C. WADDINGTON, OF WOODSTOWN, NEW JERSEY.

MEAT-CUTTER.

1,218,096.  Specification of Letters Patent.  Patented Mar. 6, 1917.

Application filed June 2, 1916. Serial No. 101,377.

*To all whom it may concern:*

Be it known that I, CLINTON LINDSEY, a citizen of the United States, residing at Salem, in the county of Salem and State of New Jersey, have invented certain new and useful Improvements in Meat-Cutters, of which the following is a specification.

This invention relates to an improved meat cutter and the principal object of the invention is to provide a meat cutter which may be used for cutting meat preparatory to making lard or for any other purpose, improved means being provided for cutting the meat into strips and for feeding the meat to the cutting means mentioned and to further provide improved means for cutting the strips of meat into small particles.

Another object of the invention is to so construct this machine that the feeder and cutters may be easily rotated through the medium of a crank handle carried by the axle of the strip cutter.

Another object of the invention is to so construct this machine that the strip cutter and feeder may be rotatably mounted to extend through the trough or cutting bench of the machine, the cutter for cutting the strips into fine parts being rotatably mounted beyond one end of the trough and in operative relation to a cutting blade secured to the end of the trough flooring.

This invention is illustrated in the accompanying drawings, wherein:—

Figure 1 is a view showing the improved cutter in top plan.

Fig. 2 is a longitudinal sectional view through the machine taken along the line 2—2 of Fig. 1.

Fig. 3 is a fragmentary view showing a section of the strip cutter in elevation and the flooring of the trough in transverse section.

The trough is provided with a flooring 10 and side walls 11 which are carried by the standards 12 and 13, side rails 14 being positioned between the standards 12 and 13 and bearing brackets 15 extending from the standards 13. At one end of the trough there is provided a ledger bar 16 which is carried by a cross bar or strip 17 and extends beyond the outer face of this cross bar so that meat cut against the cutting edge of this ledger bar 16 will drop upon the delivery table 18 down which it will travel to the receiving pan 19. At the opposite end of the trough there is provided a hinge leaf or table 20 upon which the meat may be placed prior to being passed into the trough. This table is releasably held in a raised position by the hooks 21 and it will thus be seen that when desired, the table or leaf may be released and permitted to drop down out of the way.

The feeding drum 22 and the strip cutting drum 23 extend through the trough and have their axles 24 and 25 journaled in the bearings 26 carried by the side bars 14. The gears 27 and 28 which are carried by these axles 24 and 25 mesh with the teeth of the idler gear 29 and it will thus be seen that when the crank handle 30 is turned, rotary motion will be transmitted to the drum 22 through the medium of this idler gear 29 and thus the drum caused to rotate in the same direction that the drum 23 rotates. A fly wheel 31 is mounted upon the axle 24 and will thus permit the machine to rotate easily after it has gained sufficient momentum. It will of course, be obvious that if desired a belt could be passed around this fly wheel for driving the machine or if desired the crank handle 30 could be done away with and a pulley wheel provided upon the axle 25 in place of the crank handle. The drum 22 which is the feeding drum is provided with teeth 32 and the drum 23 which is the strip cutter is provided with cutting disks 33 positioned in spaced relation as shown in Fig. 1 and having their lower portions extending through slots in the flooring 10 of the trough. Therefore the knives will cut through pieces of meat placed in the trough and will cut the meat into strips.

The knife for cutting the strips in fine parts or the mincing knife as it might be called is provided with a shaft 34 having spoke arms 35 extending therefrom and terminating in feet 36 connected with the cutting blades 37. The shaft of this mincing knife is journaled in the bearing brackets 15 and carries a gear 38 which meshes with the teeth of an idler gear 39 positioned between the gear 38 and the gear 28. It will thus be seen that when the meat is placed in the trough, it will be engaged by the teeth of the feeding drum and fed to the strip cutting knife which will cut the meat into strips. These strips will move toward the rear of the trough and across the cutting edge of the ledger bar 16. The revolving mincing knife is mounted so that its blade will engage the strips of meat and through coöperation with the ledger bar 16 will cut the strips into fine pieces. These fine pieces will drop upon the delivery table 18 from which they will travel to the receiving pan 19.

What is claimed is:—

A meat slicing and cutting machine comprising a platform, a feeding drum rotatably mounted above said platform, a ledger bar extending transversely of the platform at the end thereof, a slicing drum rotatably mounted above said platform between said feeding drum and the ledger bar and provided with cutting disks for slicing meat passing along said platform, said feeding drum being provided with teeth positioned in spaced relation to the cutting disks of the slicing drum and engaging meat to feed the same along the platform, a shaft rotatably mounted beyond the end of said platform, arms extending from said shaft, cutting blades connected with said arms and curved to extend in operative relation to the ledger bar as said shaft rotates, and means for rotating said shaft, slicing drum and feeding drum.

In testimony whereof I affix my signature in presence of two witnesses.

CLINTON LINDSEY.

Witnesses:
   EDWARD C. WADDINGTON,
   BLANCHE G. DAVIS.